Patented Oct. 18, 1938

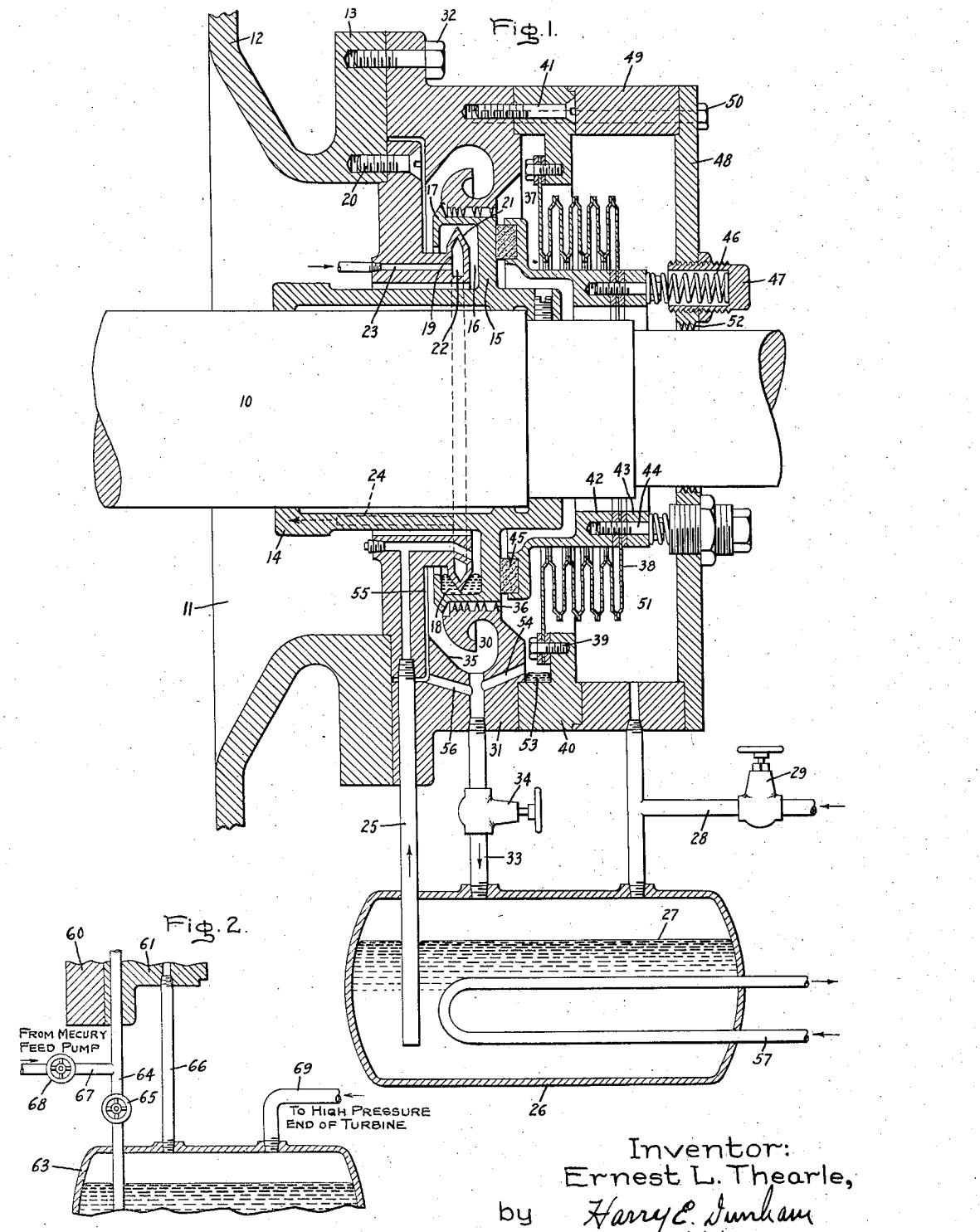

2,133,879

UNITED STATES PATENT OFFICE 2,133,879

SHAFT PACKING

Ernest L. Thearle, Schenectady, N. Y., assignor to General Electric Company, a corporation of New York Application April 28, 1936, Serial No. 76,793

2 Claims. (Cl. 286—9)

The present invention relates to packings or seals for shafts, especially horizontal shafts, to reduce the leakage along clearances defined between such shafts or rotary elements secured thereto and a stationary element or casing. Such packings are used for instance in connection with elastic fluid turbines to prevent leakage of elastic fluid along the shaft past the stationary casing and these packings are of special significance where the elastic fluid is mercury vapor or other gases or vapors endangering health or impairing the operation of various apparatus in a power plant when coming in contact therewith or easily ignitable.

The object of my invention is to provide an improved construction and arrangement of shaft packings or seals whereby leakage is substantially entirely eliminated. This is accomplished in accordance with my invention by the provision of a liquid seal, preferably a mercury liquid seal. Mercury liquid is supplied to an annular cup concentrically surrounding and secured to a shaft and in cooperative relation with a stationary vane secured to a casing to form an annular liquid seal between the vane and the cup during operation. The heat produced by the friction set up between the liquid, the cup and the vane is dissipated by cooling means including in a preferred embodiment an annular cooling chamber formed in the annular vane.

For a better understanding of what I believe to be novel and my invention, attention is directed to the following description and the claims appended thereto in connection with the accompanying drawing in which Fig. 1 illustrates a sectional view of a mercury turbine packing embodying my invention, and Fig. 2 illustrates a modification of certain elements of Fig. 1.

The mercury turbine arrangement of Fig. 1 comprises a horizontal shaft 10 projecting through an opening 11 formed by a stationary casing 12 having a flange 13. The packing arrangement for reducing leakage along the shaft past the opening 11 includes a runner 14 rigidly secured to the shaft. The intermediate portion of the runner has an annular projection or flange 15 with a recess 16 in its side wall and a ring 17 secured to the outer edge of the recessed side wall to define what in substance may be termed a cup, more specifically an annular cup concentrically surrounding and secured to the rotatable horizontal shaft 10. Liquid contained in this cup, as indicated at 18, obviously collects when at rest in the lower portion of the cup and during rotation of the cup, that is, during operation of the turbine, the liquid by centrifugal force and the friction between the rotating cup and the liquid forms an annular body of liquid. This annular body of liquid during operation forms an important element of the sealing arrangement and effects complete sealing in cooperation with a stationary element, having a portion or vane 19 disposed within the cup and another portion secured to the flange 13 by a plurality of bolts 20. The vane has a somewhat V-shaped outer edge 21 in close proximity to the inner cylindrical surface of the cup. During operation the V-shaped outer edge of the vane is immersed in the annular body of liquid formed in the cup and defines therewith a perfect seal.

The vane 19 is hollow, defining an annular cooling chamber 22 to which cooling medium is conducted through a channel 23 and discharged therefrom through a channel 24. Liquid, in the present instance mercury, is conducted to the cup 20 by a pipe 25 connected to a source, in the present instance a tank 26, containing mercury 27. Mercury liquid is forced through the conduit 25 by gas pressure set up within the tank 26. To this end an upper portion of the tank 26 is connected to a conduit 28 including a valve 29 for conducting gas under pressure to the tank. Gas pressure is necessary, especially during starting of the turbine, when the pressure in the exhaust end of the turbine is atmospheric. During operation of the turbine the pressure in the exhaust end will drop to the condenser pressure which is considerably below atmospheric pressure and this condenser pressure is set up also in the aforementioned cup and causes flow of mercury liquid through the supply conduit 25 by the action of the normal atmospheric pressure within the tank 26. During normal operation a continuous flow of mercury from the tank to the cup takes place. The mercury contained in the cup flows over the edge of the ring 17 whence the mercury flows into a chamber 30 formed in a ring member 31 secured to the flange 13 by a plurality of bolts 32. The liquid collected in the chamber 30 is returned to the tank by means of a pipe or conduit 33 including a valve 34. The valve 34 is closed during starting operation but is opened during normal operation. The mercury flowing over the edge of the ring 17 may be violently thrown outward and to reduce under such circumstances its impact I provide the portion of the chamber 30 exposed to such impact with an inclined wall 35. The chamber thus also serves to reduce or absorb the impact of mercury discharged from the cup and therefore may be termed an impactabsorbing chamber. Adjacent surfaces of the ring 31 and the runner 14, more specifically the cup, form an auxiliary packing. The outer cylindrical surface of the cup cooperates with a plurality of packing teeth 36 formed on the inner cylindrical surface of the ring 31. Mercury liquid or vapor flowing past these packing surfaces is conducted to an annular chamber 37. This chamber is defined by means including a bellows 38 having one end secured to the ring member 31. More specifically, the left-hand side of the bellows is fastened by screws 39 to a ring 40, which latter is fastened to the ring 31 by a plurality of screws 41. The right-hand disk of the bellows is fastened to a holder 42 by means including a ring 43 and a plurality of screws 44. The left-hand end of the holder 42 carries a packing ring which may be a carbon ring 45 bearing against the side of the flange or annular projection 15 of the runner 14. The holder 42 is biased towards the runner into sealing contact by means of a plurality of springs 46 bearing against the ring 43 and held in plugs 47, which latter are supported by an end disk 48. The disk 48 is secured to the ring 40 by means including a spacer or cylindrical member 49 and a plurality of bolts 50. The disk 48 with the adjacent bellows 38 form another chamber 51. The disk 48 is sealed against the shaft 10 by a packing including a plurality of packing teeth 52 formed on the inner surface of the disk. The chamber 51 is connected to the pipe 28 for receiving gas under pressure. It is desirable to maintain in the chamber 51 a gas pressure slightly above atmosphere in order to prevent leakage of air from the atmosphere into the chamber 51.

Mercury leaking past the packing teeth 36 formed on the ring member 31 flows into the chamber 37, as indicated at 53, whence it is returned to the tank 26 through a channel 54 formed in the ring member 31. The adjacent surfaces of the ring member 31 and the outer portion of the vane member form a clearance 55. Mercury liquid collecting in this clearance is drained through another channel 56 formed in the ring member 31 and communicating with the discharge pipe 33. Mercury in the tank 26 may be cooled by water forced through a cooling coil 57 having a portion disposed within the tank 26. During operation, as stated above, gas under pressure is conducted through the conduit 28 into the tank 26 and thereby causes mercury to flow from the tank 26 through the pipe 25 into the cup. Rotation of the cup causes the formation of an annular body of liquid which in cooperation with the stationary vane disposed in the cup forms a perfect liquid seal. Heat produced in the vane by friction between the rotating annular body of mercury liquid and the stationary vane is dissipated from the latter through means including a cooling chamber formed within the vane. Mercury liquid and vapor flowing past the auxiliary seal defined by adjacent cylindrical surfaces of the ring member 31 and the cup is conducted into the chamber 37 in which the vapor is condensed and returned through the channel 54 and the pipe 33 to the tank 26. The chamber 37 may be termed an inner chamber in contrast to the chamber 51 which may be termed an outer chamber. The outer chamber is maintained under a pressure slightly above atmosphere to prevent leakage of air from the atmosphere into the turbine. The conduit 28 is preferably connected to a source of inert gas such as nitrogen because such gas is not harmful when in contact with mercury, in particular in case some of the gas should leak into the interior of the turbine. During starting the valve 34 for the return pipe 33 is closed to permit the setting up of pressure in the tank 26, whereas during normal operation said valve 34 is open to permit the return of mercury from the cup. A continuous flow of mercury from the tank to the packing surfaces takes place during operation.

Whereas in the arrangement of Fig. 1 the starting, more specifically the supply of mercury from the tank to the sealing elements is effected by gas under pressure supplied to the tank 26, the modification of Fig. 2 shows an arrangement by which mercury is conducted to the sealing elements during starting by means of a mercury feed pump. Mercury power plants usually include a mercury feed pump for feeding mercury from a turbine condenser to the boiler. The arrangement of Fig. 2 more specifically includes a flange 60 and a ring member 61 corresponding to flange 13 and the ring member 31 respectively of Fig. 1. A tank 63 corresponding to the tank 26 of Fig. 1 is connected to the sealing elements by a pipe 64 including a valve 65 and mercury is returned from the sealing elements to the tank by a drain pipe 66. Connected to the pipe 64 past the valve 65 as regards the direction of flow of mercury therethrough is a pipe 67 including a valve 68 for receiving mercury liquid from a feed pump and conducting it through the pipe 64 to the sealing elements. During starting the valve 65 is closed and the valve 68 is open, whereas during normal operation the valve 68 is closed and the valve 65 open, fluid then being forced from the tank 63 to the sealing elements due to the differential pressure existing between the sealing chamber and the tank 63. Such differential pressure, however, exists only where the packing arrangement is used in connection with the low pressure end of the turbine. In case the packing is used for sealing the high pressure end of the turbine, separate means must be provided for forcing mercury liquid from the tank 63 to the sealing chamber formed by the cup. This may be accomplished by connecting the tank 63 to the high pressure end of the turbine by means of a conduit 69.

Having described the method of operation of my invention, together with the apparatus which I now consider to represent the best embodiments thereof, I desire to have it understood that the apparatus shown is only illustrative and that the invention may be carried out by other means.

What I claim as new and desire to secure by Letters Patent of the United States is:

1. The combination with a casing having an opening and a rotatable shaft projecting through the opening of a packing arrangement for reducing leakage of fluid along the shaft past the opening comprising a cup concentrically surrounding and secured to the shaft, a ring concentrically arranged with the shaft and secured to the casing defining a vane disposed within the cup, means for conducting liquid to the cup to form a rotary seal between the cup and the vane by the action of rotation of the cup and cooling means for dissipating heat produced by the friction between the sealing liquid and the vane including an annular chamber defined within the vane and channels for circulating cooling medium through the chamber.

2. The combination with a mercury turbine having a casing with an opening and a shaft projecting therethrough of a packing for reducing leakage along the shaft past the opening comprising a cup concentrically surrounding and secured to the shaft, a stationary vane disposed at least partly within the cup and secured to the casing, the vane having a V-shaped edge portion in close proximity to the surface of the cup, means for cooling the vane and other means for conducting mercury liquid to the cup to form an annular seal between the cup and the vane, said other means including a container for mercury liquid connected to the cup and conduit means for conducting non-oxidizing gas under pressure to the container.

ERNEST L. THEARLE.